United States Patent [19]

Nagata

[11] 4,452,013

[45] Jun. 5, 1984

[54] OPENING AND CLOSING MECHANISM FOR A VEHICLE SUNROOF

[75] Inventor: Kazuhisa Nagata, Okazaki, Japan

[73] Assignee: Aisin Seiki Kabushiki Kaisha, Japan

[21] Appl. No.: 404,778

[22] Filed: Aug. 3, 1982

[30] Foreign Application Priority Data

Aug. 14, 1981 [JP] Japan .................. 56-128044

[51] Int. Cl.³ ............................. E05F 11/08
[52] U.S. Cl. ...................... 49/344; 49/357; 296/223
[58] Field of Search ............... 49/344, 346, 339, 324, 49/356, 357; 296/223

[56] References Cited

U.S. PATENT DOCUMENTS

| 1,066,435 | 7/1913 | O'Rourke | 49/344 X |
| 1,460,023 | 6/1923 | Leake | 49/344 |
| 2,140,865 | 12/1938 | Tuttle | 49/357 X |
| 3,266,328 | 8/1966 | Rott | 296/223 X |
| 4,005,901 | 2/1977 | Lutke | 296/218 |
| 4,272,125 | 6/1981 | Bienert et al. | 296/223 |

Primary Examiner—Philip C. Kannan
Attorney, Agent, or Firm—Banner, Birch, McKie & Beckett

[57] ABSTRACT

An opening and closing mechanism for a vehicle sunroof of the type having a tiltable roof panel hinged to a framed roof opening. A sliding shoe assembly causes movement of a rigid actuating member, which is guided by a cam, to apply an opening or closing force to the roof panel. The mechanism is simple and compact, and is readily concealed between the vehicle roof and the frame surrounding the sunroof opening.

14 Claims, 3 Drawing Figures

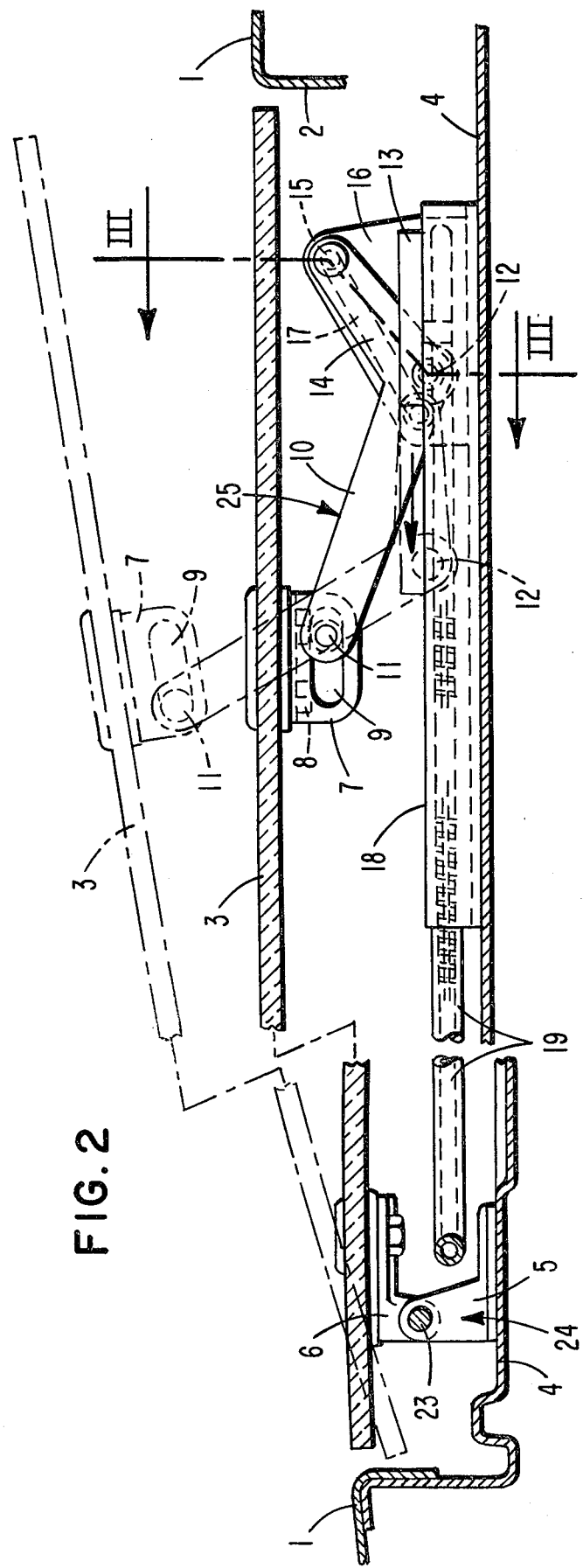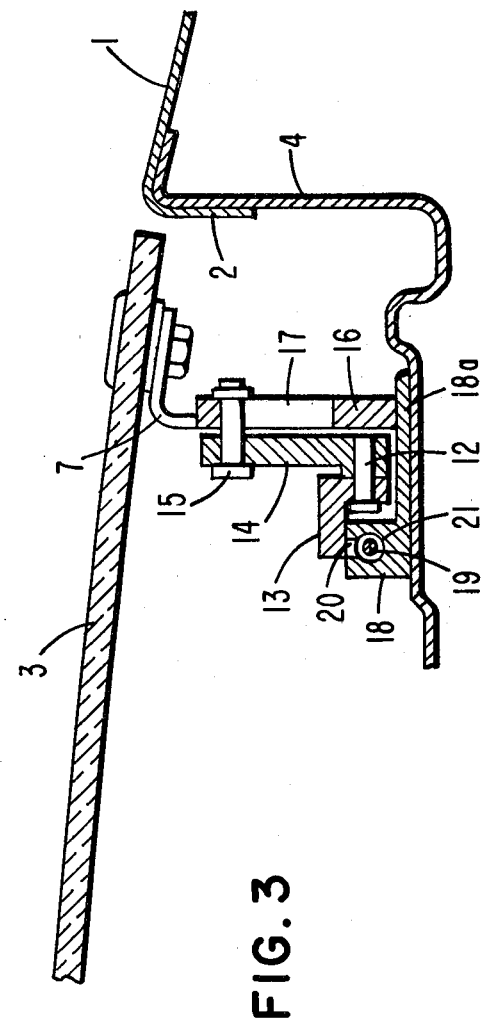
FIG. 2
FIG. 3

OPENING AND CLOSING MECHANISM FOR A VEHICLE SUNROOF

BACKGROUND OF THE INVENTION

1. Field of the Invention

This invention relates generally to sunroof structures for vehicles and, more particularly, to a mechanism for opening and closing a vehicle sunroof.

Generally there are two types of vehicle sunroofs currently in use. One is the sliding type of sunroof in which a roof panel slidably moves beneath the stationary roof portion to reveal an opening in the roof. The other type is a pivotal type in which a roof panel is pivotally attached to a frame surrounding a roof opening, usually near its front edge, and is rotated or tilted upwardly about its pivots to an open position. This invention particularly relates to an opening and closing mechanism for a sunroof of the latter type.

2. Description of the Prior Art

Typical opening and closing mechanisms for pivotal type sunroofs involve, for example, one or two toggle-type latches at the rear edge of the roof panel which fold inwardly and protrude below the vehicle headliner when the roof panel is closed. These latches often are visually unappealing and constitute somewhat of a safety hazard because of their protrusion into the passenger compartment. In addition, it is difficult for latches of this type to maintain the sunroof in a partially open position because the weight of the roof panel acting on the toggle link in its partially open position causes the toggle link to rotate towards its closed position. Attempts at concealing an opening and closing mechanism between the stationary roof portion and a frame surrounding the sunroof opening have not been very successful. These mechanisms are rather complex and bulky, and result in a lessening of headroom in the passenger compartment due to the added clearance required for the mechanism between the roof and frame. In addition, the initial force required to actuate such a mechanism is too large for smooth opening operation of the sunroof.

SUMMARY OF THE INVENTION

It is therefore an object of the present invention to obviate the above-noted disadvantages and shortcomings of the prior art by providing a simple, compact, concealable and smoothly operating opening and closing mechanisn for a vehicle sunroof of the pivoting type.

Another object of the invention is to provide such a sunroof opening and closing mechanism which enables the sunroof to be maintaind at any intermediate open position.

Another object of the invention is to provide such a sunroof opening and losing mechanism which is adapted to be driven either manually or by a drive motor.

These and other objects of the present invention are accomplished by providing an opening and closing mechanism for a vehicle sunroof of the pivoting type comprising a sliding shoe assembly adapted to be secured to the roof frame surrounding the roof opening, the assembly having a sliding shoe and guide means therefor. A rigid actuating member is adapted to interconnect the sliding shoe and the roof panel. The actuating member is pivotally connected at one location to the sliding shoe and is adapted to be pivotally connected at a second location to the roof panel. Drive means is provided for selectively sliding the shoe along the guide means. Cam means, including a cam track and a cam follower, guides the movement of the actuating member relative to the roof frame so that sliding movement of the shoe produces upward or downward movement of the actuating member at the second location to tilt the roof panel.

The invention also encompasses a vehicle roof having such a tiltable sunroof panel in combination with the above-described opening and closing mechanism.

BRIEF DESCRIPTION OF THE DRAWINGS

The novel features of the invention are set out with particularity in the appended claims, but the invention will be understood more fully and clearly from the folllowing detailed description of the invention as set forth in the accompanying drawings, in which:

FIG. 2 is a sectional view taken along line II—II in FIG. 1; and

FIG. 3 is a sectional view taken along line III—III in FIG. 2.

DETAILED DESCRIPTION

Figure 1:
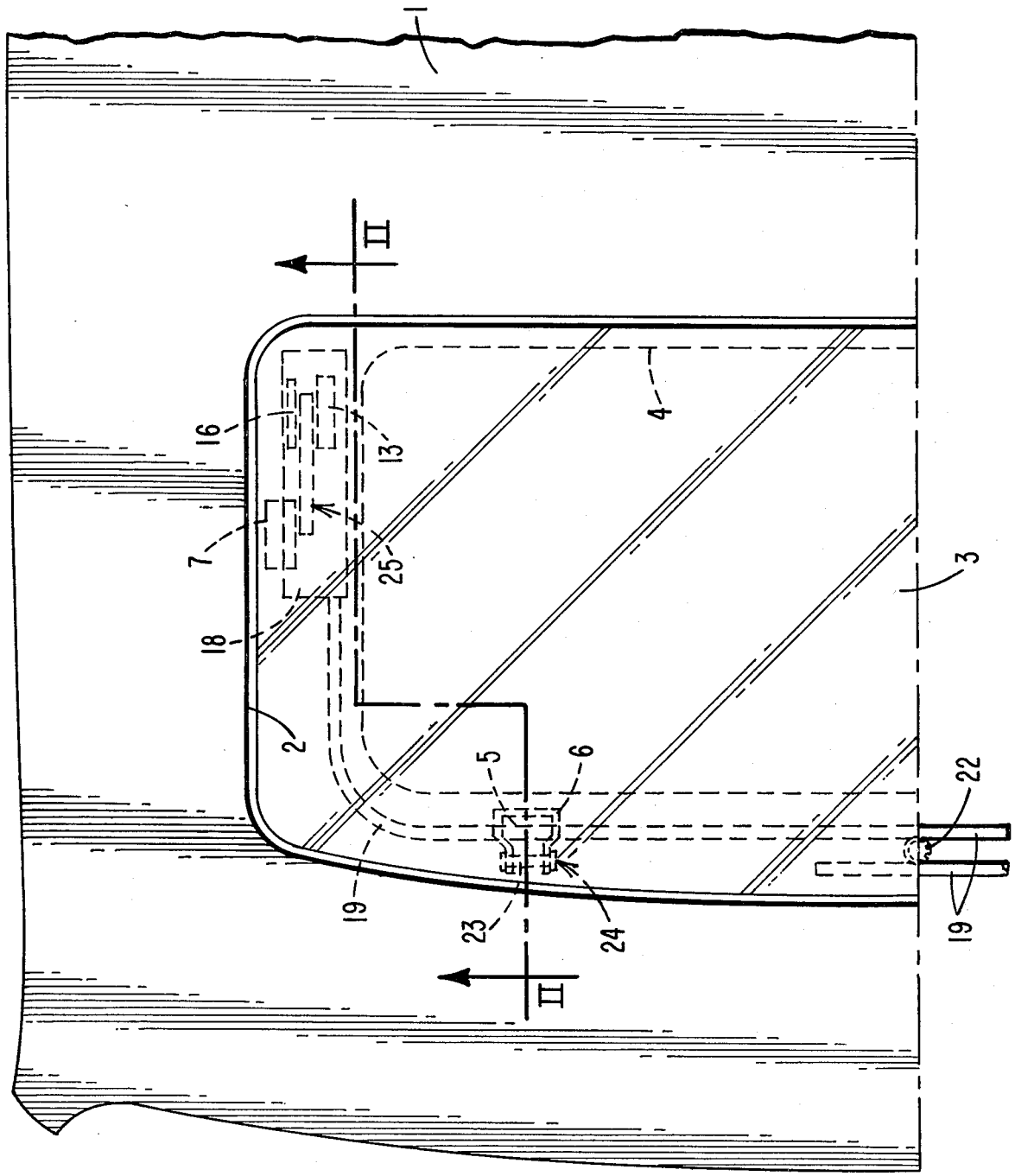
FIG. 1 is a partial plan view of a vehicle sunroof and opening and closing mechanism therefor in accordance with the invention, only one half of the sunroof being illustrated.

Referring to FIG. 1, a vehicle roof 1 has a sunroof opening 2 in which is situated a tiltable roof panel 3. A frame 4 is situated below roof 1, surrounds opening 2 and is secured to roof 1 around the perimeter of opening 2. A gasket (not shown) is secured to the perimeter of opening 2 and seals against panel 3 in a known manner when panel 3 is in its closed position. Conventional drainage channels (also not shown) are provided for carrying away rain water which may accumulate within frame 4.

Tiltable roof panel 3 is pivotally connected to frame 4 generally along the front edge thereof by a pair of hinges 24. Each hinge 24 comprises a lower hinge member 5 secured to frame 4 and an upper hinge member 6 bolted to roof panel 3. Hinge members 5 and 6 are pivotally connected by a pin 23.

FIG. 1 shows only one half of the sunroof structure; the other half is substantially the mirror image of that shown. On each side of the sunroof a slotted bracket 7 is secured to the underside of roof panel 3 adjacent its side edge and substantially to the rear of the pivoted front edge of the panel. Bracket 7 includes an elongated hole or slot 9 in which a pin 11 is slidably and pivotally retained. The force for opening or closing roof panel 3 is applied through pin 11 by a bent lever 25 having diverging arms 10, 14. Pin 11 is carried at the end of arm 10. Another pin 12 is carried at the apex of bent lever 25. Pin 12 pivotally engages a slidable shoe 13. Shoe 13 is slidably guided along a guide 18 having a base 18a secured to frame 4. Shoe 13 is connected to a sheathed push-pull cable 19 by a connector 20. Cable 19 is disposed in a guide groove 21 in guide member 18, the cable being slidably movable therein. The open upper portion of guide groove 21 is narrowed to retain cable 19 therein, and to allow only connector 20 to pass therethrough.

Cable 19 is a known type of push-pull cable, having a spiral wire wound around the cable core. Cable 19 extends around frame 4 to approximately the mid-point of the front edge of opening 2. A similarly situated cable 19 extends to the mid-point of the front edge of opening 2 from the opposite side of the sunroof. The spiral wraps of these cables simultaneously engage opposite sides of a drive gear 22. Drive gear 22 may be driven by a manual crank, a drive motor, or any other suitable drive means. Thus, rotation of drive gear 22 effects simultaneous movement of cables 19, sliding movement of shoes 13 and movement of bent levers 25.

The motion of bent lever 25 is controlled by a cam plate 16, affixed to base 18a, and a cam track or slot 17 formed in cam plate 16. A cam follower pin 15, carried at the end of arm 14 of bent lever 25, is slidably and pivotally retained in cam track 17. Hence, forward motion of sliding shoe 13 (to the left as seen in FIG. 2) will pull bent lever 25 forwardly and cause cam follower pin 15 to descend along cam track 17. This motion will cause bent lever 25 to rotate clockwise about pin 12. Lever 10 therefore will be raised, resulting in upward movement of pin 11 and roof panel 3. Reverse motion of sliding shoe 13 will cause a reversal of the above-described motion to close roof panel 3.

The limits of motion of roof panel 3 are established by the ends of cam track 17. Thus, when pin 15 reaches the lower end of cam track 17, roof panel 3 can be opened no further. Similarly, when pin 15 reaches the upper end of cam track 17, roof panel 3 will be in its closed position, aligned with the remaining portion of roof 1 and in sealing engagement with the gasket. During the closing operation, the weight of roof panel 3 assists the cable in rotating bent lever 25 counterclockwise, so that the compressive load on the cable is reduced. This makes for a smoother closing operation.

The above described mechanism readily accomplishes the stated objectives. Smooth opening movement of roof panel 3 results from the mechanical advantage afforded by cam track 17 rotating bent lever 25 when shoe 13 is slid forwardly. The mechanism also will effectively resist self-closing due to the weight of roof panel 3.

It will be apparent to those skilled in the art that numerous changes and modifications may be made within the scope of the invention. For example, the relative positions of cam plate 16 and slotted bracket 17 may be reversed, so that cam plate 16 is located forwardly of slotted bracket 7. In that case, the cam track 17 simply would have a different orientation and inclination in order to effect proper movement of bent lever 25. Bent lever 25 need not take the precise form illustrated, i.e., that of an actually bent lever. Any type of rigid actuating member may be used which couples the roof panel, sliding shoe and cam track at three different locations, and is configured to fit within the space allotted for the mechanism. For example, this member could be a simple triangular plate having pins 11, 12 and 15 near its vertices. The positions of cam track 17 and cam follower pin 15 could be reversed, with cam track 17 located on a plate-like actuating member 25 and pin 15 mounted on a stationary bracket affixed to base 18a. Although two opening and closing mechanisms have been described in connection with this detailed description, it is possible to use a single opening and closing mechanism arranged generally along the rear edge of the roof panel to apply an opening or closing force generally at the center of the panel. Other variations and modifications will be apparent to those skilled in the art without departing from the true spirit and scope of the invention, which is to be limited only by the appended claims.

I claim:

1. An opening and closing mechanism for a vehicle sunroof of the type having a tiltable roof panel hinged to a framed roof opening for pivotal movement generally along one edge thereof, the mechanism comprising:
    a sliding shoe assembly adapted to be secured to the roof frame, said assembly having a sliding shoe and guide means therefor;
    a rigid actuating member adapted to interconnect said sliding shoe and said roof panel, said actuating member being pivotally connected at one location to said sliding shoe and adapted to be pivotally connected at a second location to said roof panel;
    drive means for selectively sliding said shoe along said guide means; and
    cam means including a cam track and a cam follower for guiding the movement of said actuating member relative to the roof frame so that sliding movement of said shoe produces upward or downward movement of said actuating member at said second location to tilt said roof panel.

2. A sunroof mechanism according to claim 1 wherein said cam means comprises a cam plate which is fixed relative to said shoe guide means, said cam track is carried by said cam plate, and said cam follower comprises a cam follower pin carried by said actuating member and retained in said cam track.

3. A sunroof mechanism according to claim 2 wherein said cam track is a slot in said cam plate.

4. A sunroof mechanism according to claim 2 wherein said actuating member is a bent lever having two arms which diverge from an apex, one of said arms is adapted to be pivotally connected to the roof panel, the other of said arms carries said cam follower pin, and said apex is pivotally connected to said sliding shoe.

5. A sunroof mechanism according to claim 4 wherein the pivoted connection between said one arm and the roof panel comprises a slotted bracket adapted to be affixed to the underside of the roof panel, and a pivot pin carried by said one arm and slidably and pivotally engaged in the slot of said bracket.

6. A sunroof mechanism according to claim 1 wherein said drive means comprises a push-pull cable connected to said sliding shoe.

7. In a vehicle roof having a tiltable sunroof panel hingedly arranged in a framed roof opening for pivotal movement generally along one edge thereof, and an opening and closing mechanism therefor, the improvement comprising:
    a sliding shoe assembly secured to the roof frame, said assembly having a sliding shoe and guide means therefor;
    a rigid actuating member interconnecting said sliding shoe and said roof panel, said actuating member being pivotally connected at one location to said sliding shoe and pivotally connected at a second location to said roof panel;
    drive means for selectively sliding said shoe along said guide means; and
    cam means including a cam track and a cam follower for guiding the movement of said actuating member relative to the roof frame so that sliding movement of said shoe produces upward or downward movement of said actuating member at said second location to tilt said roof panel.

8. A vehicle roof according to claim 7 wherein said cam means comprises a cam plate which is fixed relative to said shoe guide means, said cam track is carried by said cam plate, and said cam follower means comprises a cam follower pin carried by said actuating member and retained in said cam track.

9. A vehicle roof according to claim 8 wherein said cam track is a slot in said cam plate.

10. A vehicle roof according to claim 8 wherein said actuating member is a bent lever having two arms which diverge from an apex, one of said arms is pivotally connected to the roof panel, the other of said arms carries said cam follower pin, and said apex is pivotally connected to said sliding shoe.

11. A vehicle roof according to claim 10 wherein the pivotal connection between said one arm and the roof panel comprises a slotted bracket affixed to the underside of the roof panel and a pivot pin carried by said one arm and slidably and pivotally engaged in the slot of said bracket.

12. A vehicle roof according to claim 7 wherein said drive means comprises a push-pull cable connected to said sliding shoe.

13. A vehicle roof according to claim 12 comprising two of said opening and closing mechanisms disposed on opposite sides of said roof panel, said drive means further comprising a common drive member in driving engagement with the push-pull cables of both mechanisms.

14. A vehicle roof according to claim 13 wherein said cables are spiral wire wound cables and said common drive member is a drive gear having teeth in engagement with the spiral windings of both of said cables.

* * * * *